3,061,537
ELECTROLYTE PURIFYING DEVICE
Aisaburo Yagishita, Chigusa-ku, Nagoya, Japan, assignor to Yoshikazu Ukai, Tokyo, Japan
Filed Oct. 21, 1958, Ser. No. 768,735
Claims priority, application Japan Oct. 31, 1957
3 Claims. (Cl. 204—275)

The present invention is related to a device for purifying electrolyte.

It is an object of the present invention to provide a device for purifying electrolyte by which impurities can be removed promptly and uniformly.

It is a further object of the present invention to provide a purifying device by which impurities of an electrolyte can be removed promptly and to a certainty while a plating operation is being continued.

An additional object of the present invention is to provide a purifying device by which purification of an electrolyte can be carried out most efficiently with minimum loss of an object metal.

With these and other objects in view and hereinafter set forth, various modes of embodiments of the present invention are fully described in the ensuing specification and delineated in the claims appended hereto.

In the attached drawings wherein a few preferred embodiments of the present invention are illustrated, by way of example only, wherein.

In case two or more ions exist together in an electrolyte, for example, in an electrolyte of nickel, if copper, zinc and ions other than of nickel co-exist as impurities, it is necessary to purify the electrolyte by removing the impurities as they are deterrent to the electrolytic efficiency.

In the methods hitherto known, by utilizing the difference in the electrolytic condition namely of the decomposition voltage and the current condition, purification of electrolyte has been carried out by depositing the impurities by means of a plain or a corrugated cathode. In the known methods referred to above, however the metal ions as impurities have been rather slow in reaching the surface of the cathode and accordingly the methods have not only involved a waste of time, but also it has been very difficult to remove the impurities uniformly from the electrolyte. Attempts have been made to increase the voltage used, but in this case ions of the object metal such as nickel have also been deposited together with the impurities and furthermore as the amount of the impurities are reduced in the electrolyte, more ions of the object metal have been deposited and accordingly the methods hitherto known have been extremely uneconomical. Thus, in conventional methods, it has, after all, been practically impossible to purify an electrolyte in which extremely small quantity of impurity ions co-exist with nickel ions of larger quantity by depositing the former selectively and efficiently.

According to the present invention, however, all the defects which have been incidental to the known methods and apparatus described above, have been completely eliminated and the present invention consists of a purifying device in which a cathode facing anode in electrolyte is made of liquid-passing conductive material such as porous carbon or reticulated metal, through which the electrolyte is made to pass forcibly at a considerably high velocity.

Figure 1:
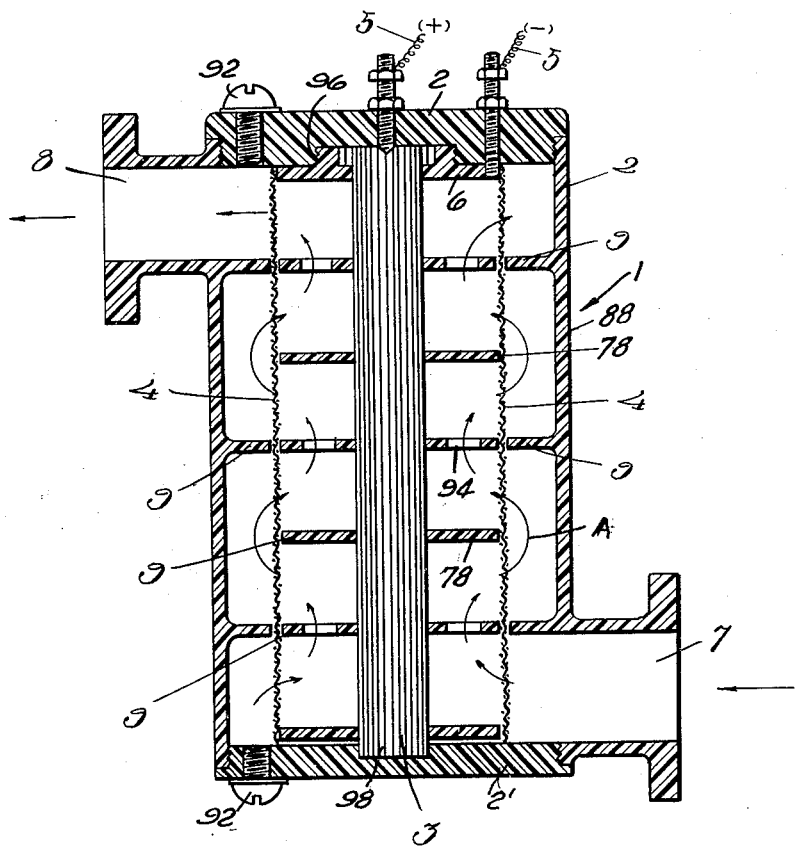
FIG. 1 is a vertical sectional view of a first embodiment of the present invention.

Referring now to the drawings and in particular to FIG. 1, it will be noted that the inventive electrolyte purifying device comprises an upright tank generally indicated by reference numeral 1. The tank includes an annular wall portion 88 having screwed or otherwise secured thereto a top plate or cover 2 and a bottom plate 2', respectively. The tank is either made of an insulating material, such as a synthetic plastic, or of metal. In the latter case, the tank has, of course, to be lined with a suitable insulating material. A central anode 3 is provided within the space defined by the tank. For the purpose of mounting the anode 3 within the tank, the bottom plate 2' has a recess portion 98 for receiving the bottom end of the anode 3 while a mounting plate 6 is screwed into the top plate 2 as indicated at 96, the mounting plate 6 having a central bore for receiving the top portion of the anode 3. The mounting plate 6 is of insulating material.

The cathode indicated by reference numeral 4 surrounds the anode and is in the form of a tubular screen permitting the passage of electrolyte therethrough. The cathode 4 is made of a liquid-passing conductive material and may consist of porous carbon or reticulated metal. In the embodiments shown, the screen is made from reticulated metal. If porous carbon is used, the porosity of the carbon increases the surface area to a considerable extent, thereby in turn enlarging the liquid contacting surface, thus increasing the intended purification effect.

It will be noted that the tank wall 88 proper is provided with a number of integral partitions or baffle plates 9 projecting into the interior of the tank space. The partitions 9 both serve as guides or supports for the tubular cathode screen 4 and form part of flow deflecting means for the electrolyte to be passed through the tank. The flow deflecting means also comprise baffle plates 78 fixed to the anode 3. It will be observed that some of the anodular baffles have openings or bores 94. The baffle plates 78 stop short of the cathode screen 4 to prevent short circuiting and the members 9 and 78 with their openings 94 are arranged so as to deflect the flow of electrolyte to perform a tortuous path through the tank, thereby repeatedly forcing the electrolyte through the cathode screen 4 as indicated by arrows A. The tubular inlet into the device is indicated by reference numeral 7 while the exit or discharge opening at the top is indicated by reference numeral 8. The usual electrical connections and terminals are schematically represented by reference numerals 5.

Reference numeral 92 indicates screws which close air vents provided in the top and bottom plates 2 and 2', respectively.

The operation of the device of FIG. 1 is as follows:

Contaminated electrolyte is supplied through inlet opening 7 and due to the provision of the flow deflecting means 9, 78, 94, the electrolyte will pass through the device in a wavy or tortuous path repeatedly traversing the screen surface of the cathode 4. The electrodes 3 and 4 are electrically connected as indicated schematically by reference numerals 5 and undesired metal ions will thus be deposited on the cathode screen. The purified electrolyte is discharged through the exit opening 8. Due to the fact that the electrolyte is repeatedly deflected to flow through the device in a tortuous path thereby passing through the screen, and due to the increased contact area of the cathode, a very efficient deposition of unwanted metal ions on the cathode is accomplished.

Figure 2:
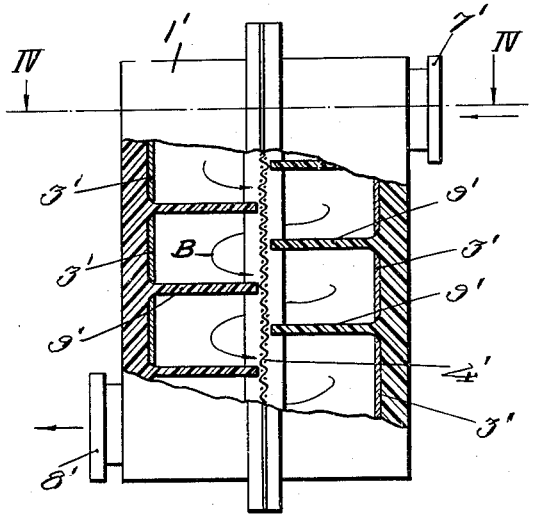
FIG. 2 is a front elevational view showing a device for purifying electrolyte, with parts cut away showing details of another embodiment of the present invention in section.
Figure 3:
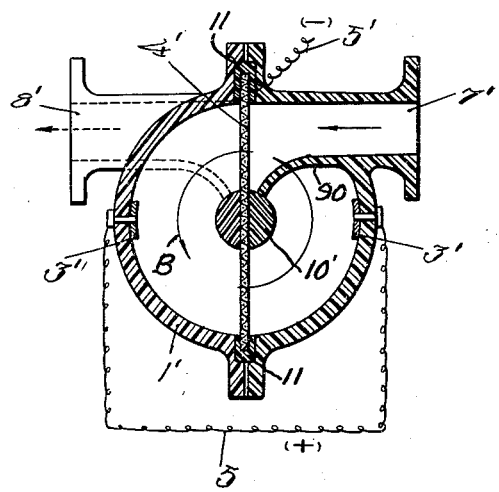
FIG. 3 is a horizontal sectional view taken along the plane of line IV—IV in FIG. 2.

According to the embodiment of FIGS. 2 and 3, the cathode 4' is not tubular as in the preceding embodiment, but is a linearly extending screen which extends diametrically through the tank space. For the purpose of mounting the cathode screen 4', the tank wall 1' is recessed to accommodate a mounting element 11 which holds the cathode 4'. A center post 10' is centrally arranged within the cylindrical tank space and the tank wall proper has an inwardly projecting deflecting portion 90 which, in combination with the strategically positioned baffle plates or partitions 9', causes the electrolyte to flow through the tank in a spiral path. The anode 3' in this embodiment extends along the inner wall of the tank 1' while the inlet into the tank is indicated by reference numeral 7' and the outlet by reference numeral 8'. The flow path of the electrolyte from the inlet 7' towards the outlet 8' is indicated by the arrows B. The electrical connections are indicated by reference numerals 5'. The center post 10' and the mounting member 11 are made of insulating materials.

While I have illustrated and described the preferred embodiments of my invention, it is to be understood that I do not limit myself to the precise constructions herein disclosed and the right is reserved to all changes and modifications coming within the scope of the invention as set forth in the appended claims.

Having thus described my invention, what I claim as new and desire to secure by United States Letters Patent is:

1. An electrolyte purifying device comprising a tank, inlet means on said tank for supplying electrolyte into said tank, discharge means on said tank spaced from said inlet means for discharging electrolyte from said tank, an anode arranged within said tank, a cathode arranged within said tank and spaced from said anode, said cathode being in the form of a screen permitting passage of electrolyte therethrough, and a plurality of spaced staggered flow deflecting plates mounted within said tank on alternate sides of said screen for directing electrolyte passing from said inlet means towards said discharge means repeatedly through said cathode screen.

2. An electrolyte purifying device as claimed in claim 1, wherein said cathode is made of porous carbon.

3. An electrolyte purifying device as claimed in claim 1, wherein said cathode is made of reticulated metal.

References Cited in the file of this patent

UNITED STATES PATENTS

| | | |
|---|---|---|
| 2,334,790 | Roffy | Nov. 23, 1943 |
| 2,468,766 | Low | May 3, 1949 |
| 2,640,026 | Whittington | May 26, 1953 |